(12) United States Patent
Fritz et al.

(10) Patent No.: US 9,832,356 B2
(45) Date of Patent: Nov. 28, 2017

(54) CAMERA MODULE FOR A VEHICLE AND METHOD FOR ITS PRODUCTION

(71) Applicant: Robert Bosch GmbH, Stuttgart (DE)

(72) Inventors: Steffen Fritz, Wurmberg (DE); Uwe Apel, Neckartailfingen (DE); Ulrich Seger, Leonberg-Warmbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/410,682

(22) PCT Filed: Apr. 29, 2013

(86) PCT No.: PCT/EP2013/058842
§ 371 (c)(1),
(2) Date: Dec. 23, 2014

(87) PCT Pub. No.: WO2014/000914
PCT Pub. Date: Jan. 3, 2014

(65) Prior Publication Data
US 2015/0207967 A1    Jul. 23, 2015

(30) Foreign Application Priority Data
Jun. 26, 2012    (DE) ........................ 10 2012 210 818

(51) Int. Cl.
*H04N 5/225*    (2006.01)
*B60R 11/04*    (2006.01)
*B60R 11/00*    (2006.01)

(52) U.S. Cl.
CPC ........... *H04N 5/2254* (2013.01); *B60R 11/04* (2013.01); *H04N 5/2252* (2013.01); *H04N 5/2253* (2013.01); *H04N 5/2257* (2013.01); *B60R 2011/0026* (2013.01); *Y10T 29/49826* (2015.01)

(58) Field of Classification Search
CPC ..................................................... H04N 5/2252
USPC ......................................................... 348/374
See application file for complete search history.

(56) References Cited

U.S. PATENT DOCUMENTS

| | | | |
|---|---|---|---|
| 6,507,700 B1 * | 1/2003 | Takekuma | G03B 17/08 348/81 |
| 9,544,487 B2 * | 1/2017 | Bauer | H04N 5/2251 |
| 2005/0035421 A1 * | 2/2005 | Kayanuma | H01L 27/14618 257/432 |

(Continued)

FOREIGN PATENT DOCUMENTS

| | | |
|---|---|---|
| DE | 10 2005 000655 | 7/2006 |
| DE | 10 2009 027514 | 1/2011 |

(Continued)

*Primary Examiner* — Antoinette Spinks
(74) *Attorney, Agent, or Firm* — Norton Rose Fulbright US LLP; Gerard Messina

(57) ABSTRACT

A camera module, in particular for a vehicle, the camera module having at least: an objective having a lens mount and at least one lens, an image sensor for acquiring and converting optical signals into electrical signals, a bearer device on which the image sensor is mounted and contacted, and a camera housing for accommodating the objective and the bearer device. The objective is connected to the camera housing, in particular to a first housing part, and is borne by the camera housing. The bearer device can in particular be fixed on the objective or on the first housing part.

25 Claims, 4 Drawing Sheets

(56) References Cited

U.S. PATENT DOCUMENTS

| | | | |
|---|---|---|---|
| 2008/0291322 A1* | 11/2008 | Schick | H04N 5/2253 348/374 |
| 2009/0109328 A1* | 4/2009 | Moon | H04N 5/2252 348/374 |
| 2009/0128684 A1* | 5/2009 | Apel | H01L 27/14618 348/360 |
| 2009/0294629 A1* | 12/2009 | Drotleff | H01L 27/14618 250/208.1 |
| 2010/0194974 A1* | 8/2010 | Hoshikawa | H04N 5/2254 348/373 |
| 2011/0063498 A1* | 3/2011 | An | H04N 5/2252 348/375 |

FOREIGN PATENT DOCUMENTS

| | | |
|---|---|---|
| DE | 10 2010 00395 | 10/2011 |
| JP | 2002-090603 A | 3/2002 |
| JP | 2005-006769 A | 1/2005 |
| JP | 2005-064591 A | 3/2005 |
| JP | 2007-004068 A | 1/2007 |
| JP | 2007-225991 A | 9/2007 |
| JP | 2008-046169 A | 2/2008 |
| JP | 2011-209417 A | 10/2011 |
| WO | 2006/087284 | 8/2006 |
| WO | 2007/107392 | 9/2007 |

* cited by examiner

CAMERA MODULE FOR A VEHICLE AND METHOD FOR ITS PRODUCTION

FIELD OF THE INVENTION

The present invention relates to a camera module for a vehicle and a method for its production.

BACKGROUND INFORMATION

Camera modules for vehicles have in general an objective having a lens mount and at least one lens, an image sensor, and a bearer device on which the image sensor is mounted and contacted. For this purpose, the bearer device is fashioned for example as a circuit board. The objective is accommodated in an objective receptacle (lens holder) so as to be capable of longitudinal displacement in order to enable adjustment. The objective receptacle is generally fastened on the bearer device.

The adjustment takes place by acquiring for example a test pattern in a relevant object width, and evaluating the image signals of the image sensor in order to determine a longitudinal position of the objective with the best possible contrast and to adjust it so that the image sensor is in the image plane. Subsequently, the objective is fixed on the objective receptacle. The constructive unit made up of the bearer device with image sensor and objective fixed on the bearer device, designated overall as the imager module, is then installed in a camera housing for protection against external influences and for installation in the vehicle.

The electrical connection of the image sensor should take place as far as possible without force, in order to keep the influence on the positional stability in the image plane low. The assembly made up of the image sensor and the objective defines the optical axis and may be capable of being mounted in the camera housing in such a way that the central axis of view, i.e. the axis of symmetry of the region of acquisition, or opening angle, can be precisely defined.

German patent document DE 10 2009 027 514 A1 discusses such a camera module, in which the objective is fixed on the objective receptacle (lens holder) by an adhesive that cures under UV radiation.

In general, the expensive production from a large number of components having corresponding tolerances, and the problem of determining the axis of view relative to the camera housing, are disadvantageous.

SUMMARY OF THE INVENTION

According to the present invention, the objective is connected to the camera housing. With this connection, the objective is borne or held by the camera housing. The bearer device can be fastened on the objective and/or on the first housing part according to different specific embodiments, and is held thereby.

Differing from the conventional configuration, therefore, it is not the objective that is held and/or borne by the bearer device, which then is in turn borne by the camera housing; rather, the camera housing, in particular a first housing part, is used to accommodate and to hold the objective.

Advantageously, corresponding fitting surfaces (contact surfaces) are provided on the objective, e.g. the outer side of the lens mount, and on the first housing part of the camera housing. The connection can be fashioned directly, i.e. through the direct seating of fitting surfaces, or indirectly, using an intermediate arrangement such as distance rings positioned between them. The bearer device, with mounted image sensor, is then fastened on this constructive unit made up of the first housing part and objective.

Thus, in the production method according to the present invention first the objective is placed into the first housing part, and subsequently the adjustment and/or focusing takes place, in which the bearer device, together with the mounted image sensor, is positioned relative to the objective, in particular through longitudinal displacement along an axis of symmetry of the objective, which thus forms the optical axis. Through the subsequent fixing of the bearer device—according to different specific embodiments, on the objective and/or on the first housing part— the optical characteristics, in particular the optical axis and the position of the image plane relative to the image sensor, and in addition also the position of the optical axis relative to the camera housing, are thus defined. The force-free contacting of the bearer device on, for example, a main circuit bearer connected to the first housing part can then follow. The camera housing can then be sealed for example by a second housing part.

The first housing part can be produced in particular as a die-cast part made of metal, e.g. aluminum, in order to enable a high degree of shape retention, stability, and precision of the positioning of the objective attached thereon. For this purpose, the first housing part can be subsequently processed at its contact surface in order to accept the objective.

According to the present invention, this already results in some advantages. Thus, the attachment of the objective on the first housing part already ensures that tolerances of the bearer device and its attachment on the housing do not influence the position of the axis of symmetry of the objective relative to the camera housing, and thus also do not influence the direction of view, or do not do so to a relevant extent, as can happen in particular given conventional fastening of the objective on an objective receptacle of the bearer device with subsequent attachment of the bearer device in the camera housing.

The bearer device for holding and contacting the image sensor may be produced in MID technology (Molded Interconnect Devices). MID components have metallic printed conductors for electrical connections directly to e.g. injection-molded plastic bearers. In this way, electric circuits can be realized on spatially more complex structures, and the structures can at the same time also take over mechanical functions without requiring the attachment of additional parts. In this way, a high degree of mechanical strength is also achieved.

Thus, an additional objective holder (lens holder) attached on the bearer device can be omitted, so that in this way as well the part count and tolerances can be reduced. In particular, the realization of the bearer device in MID technology enables suitable shapings for the guiding and positioning on the objective and for sealing and/or also for fastening on the first housing part. Thus, in the fixing after the focusing, instead of being fastened on the objective the bearer device can also be fastened on the first housing part connected rigidly to the objective, which, according to different specific embodiments, can take place in different ways due to the wide ranges of free choice of configuration of the first housing part and of the bearer device, in order to ensure tightness, a high degree of stability, and an easy process of fastening by e.g. gluing.

Thus, the three-dimensional, one-part (MID) realization of the bearer device enables particular advantages in combination with the direct connection of the objective on the first housing part.

The second housing part can e.g. also be fashioned as a metal pressure die-cast part.

According to the present invention, it is enabled that only the first housing part is relevant for the optical characteristics, including adjustment, positioning of the image sensor, and orientation of the direction of view of the imager module in the camera housing, and may also be for the accommodation of a main circuit bearer for the further active and passive components of the camera module, and if required also the attachment of a camera mount, and that the second housing part is thus used only to complete the camera housing and the seal.

According to the present invention, in this way a rapid, secure, precise, and low-cost production is enabled. This enables a compact form with a low number of components that can be produced with a high degree of precision.

DETAILED DESCRIPTION

Figure 1:
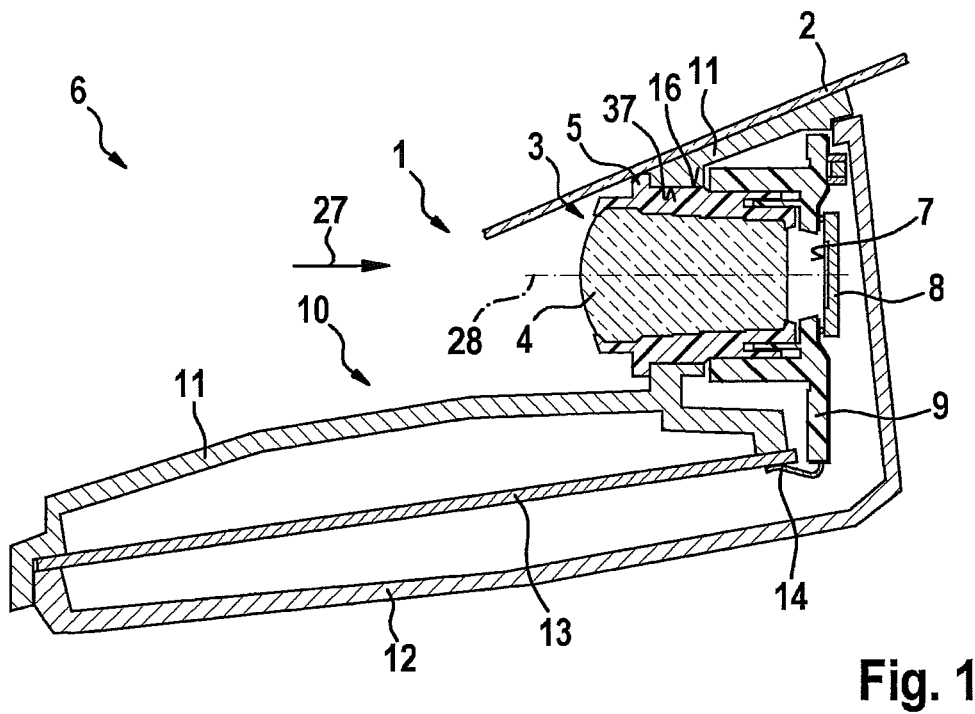
FIG. 1 schematically shows a first specific embodiment of a camera module in longitudinal section.
Figure 2:
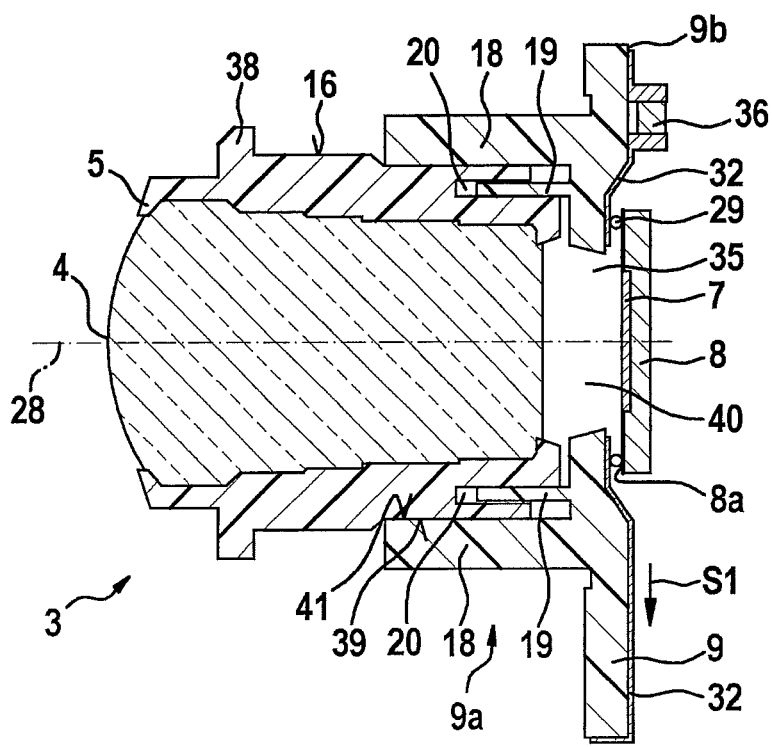
FIG. 2 shows the assembly of objective and bearer device of the specific embodiment of FIG. 1.
Figure 3:
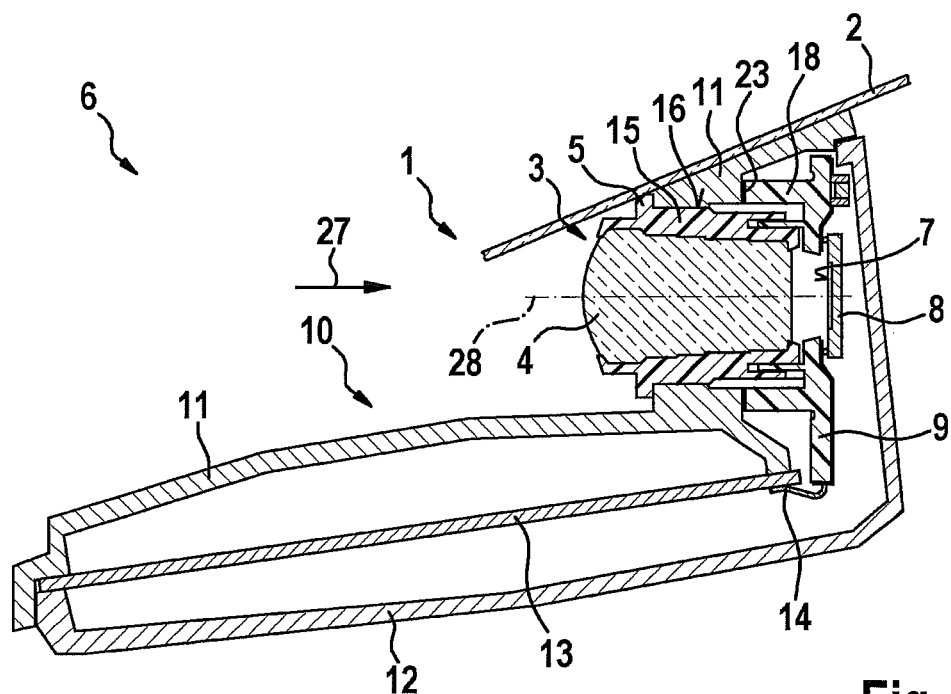
FIG. 3 shows a second specific embodiment of a camera module in longitudinal section.

Camera module 1 of FIGS. 1, 2, and 3 is in each case attached behind a vehicle windshield 2, in particular a front windshield or rear windshield of a vehicle 6 (not shown in more detail). Radiation 27, in particular light in the visible range or also in the IR range, is received by camera module 1. Radiation 27 can in particular enter through vehicle windshield 2, i.e. can come from outside the vehicle, and/or can come from the interior of the vehicle for interior monitoring; in addition, if a sensor system of the windshield outer surface is present it is also for example possible to couple light into vehicle windshield 2 and for this light to subsequently be sensed by camera module 1.

Camera module 1 has:

an objective 3 having a lens mount 5 and having at least one lens 4 accommodated in lens mount 5, an image sensor 8, a bearer device 9, and a camera housing 10. In addition, for example a camera mount can be provided for fastening camera housing 10 on vehicle windshield 2.

Instead, of a single lens 4 as shown, it is also possible to provide a plurality of lenses 4. Image sensor 8 for acquiring and converting optical signals into electrical signals S1 can in particular be an imager chip. Image sensor 8 and objective 3 define an optical axis 28. As can be seen in particular in FIG. 7, image sensor 8 has a light-sensitive sensor surface 7 and signal lines 30, as well as contacting surfaces 31 that are contacted via contacting arrangement 29, in particular stud bumps 29, to printed conductors 32 of bearer device 9. Image sensor 8 may be mounted in flip-chip technology, so that on its front side 8a (upper side) there are situated both light-sensitive sensor surface 7 and also signal lines 30 and contacting surfaces 31. Thus, an opening 35 for the passage of light is provided in bearer device 9 in the area of optical axis 28.

Bearer device 9 is fashioned as MID (Molded Interconnect Device) bearer device 9, made of plastic, and is contoured in three dimensions. Outside image sensor 8, it can also accommodate a part of the circuits for signal preparation of image signal S1; i.e., passive components 36 for signal conditioning can additionally be attached on bearer device 9; one of these components is shown. Printed conductors 30 are attached on a rear side 9b of bearer device 9, and may form a one-layer wiring level; as shown, for better contacting they can extend up to a side edge of bearer device 9. Front side 9a of bearer device 9 is more strongly contoured.

Bearer device 9 has on its front side 9a objective receptacle arrangement 18, 19 for accommodating and/or sealing objective 3, which are fashioned differently according to the specific embodiments, and each enable a displacement of objective 3 in the direction of optical axis 28 in order to focus camera module 1, so that a positioning of image sensor 8 in the respective image plane is enabled during the acquisition e.g. of an external test pattern. Objective receptacle arrangements 18, 19 are fashioned differently according to the specific embodiments; in these specific embodiments, in each case an inner sealing ring 19 is provided that engages in a groove 20 of lens mount 5.

Camera housing 10 is made up of a first housing part 11 for accommodating objective 3 and bearer device 9, and a second housing part 12 for sealing first housing part 11. Housing parts 11 and 12 may be produced in each case as metal die-cast parts, in particular as aluminum die-cast parts. In the depicted specific embodiments, in each case first housing part 11 is the upper housing part, and is closed at the rear and at the bottom by lower, second housing part 12. In principle, camera housing 10 can also include further components; the depicted specific embodiments however enable a complete accommodation of the components with low production costs, because housing parts 11, 12 do not have any parts that engage behind.

Figure 7:
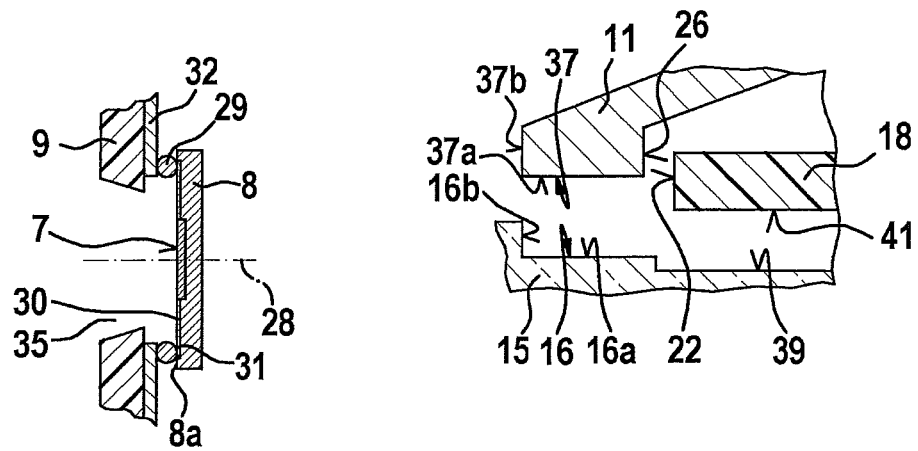
FIG. 7 shows enlarged details of the various specific embodiments in order to depict some relevant surfaces.

The fastening of objective 3, or of lens mount 5 of objective 3, on first housing part 11 can take place differently according to the various specific embodiments. In general, first housing part 11 has a first housing fitting surface 37 with which it lies (directly or indirectly) against a first objective fitting surface 16. As shown in FIG. 7, in each case first objective fitting surface 16 may extend over partial surfaces 16a and 16b, partial surface 16a representing a cylindrical outer surface of lens mount 5, and partial surface 16b being fashioned on the rear side of a shoulder 38 and acting as a stop when objective 3 is inserted into housing part 3. Correspondingly, first housing fitting surface 37 of first housing part 11 is formed by partial surfaces 37a and 37b, of which partial surface 37a is cylindrical and partial surface 37b runs e.g. perpendicular thereto and is seated on partial surface 16b. First housing fitting surface 37 is precisely formed for precise accommodation, which may be through later machining of housing part 11 produced by die-casting, in particular through cutting machining. It is thus the first fitting segment for the fitting of objective 3 in first housing part 11.

Intermediate arrangements, e.g. distance rings, can also be placed between first housing fitting surface 37 and first objective fitting surface 16, the distance rings being matched to the focal width of objective 3. Thus, according to the present invention an indirect seating of surfaces 37 and 16 is also possible via such intermediate arrangements. Relevant here is the positioning and fastening of the objective on the first housing part via fitting surfaces 16 and 37.

The depicted specific embodiments of FIGS. 1 through 6 differ in particular with regard to the fastening of MID bearer device 9, as well as the configuration of the fitting surfaces.

According to the specific embodiment shown in FIGS. 1 and 2, MID bearer device 9 is fastened only to objective 3, or lens mount 5 thereof. For this purpose, MID bearer device 9 has, in addition to inner sealing ring 19 that engages in groove 20, an outer bearer ring 18 that lies with a fitting surface 41 on a cylindrical second objective fitting surface 39, so that longitudinal displacement along optical axis 38 for focusing is enabled. Second objective fitting surface 39 thus acts as second fitting segment of objective 30 for fitting objective 3 on bearer device 9. The two objective fitting surfaces 16 and 39 are thus cylindrical and can thus be fashioned precisely, and are situated one after the other in the direction of optical axis 38. Through rings 18, 19 and groove 20, a sealing labyrinth is also formed for sealing a space 40 behind the lens, between image sensor 8, or its sensor surface 7, and lens 4. Inner sealing ring 19 can be without bearing function, and can be used solely for guiding and/or sealing.

Bearer device 9 is connected via its printed conductors 32 and a data connection 14, e.g. a flex cable or wire bonds, to a main circuit bearer, e.g. a circuit board 13, that ensures the complete functionality of camera module 1, and thus has active and passive components 42 for receiving and processing image signal S1, and may also be for contacting, in vehicle 6.

Figure 8:
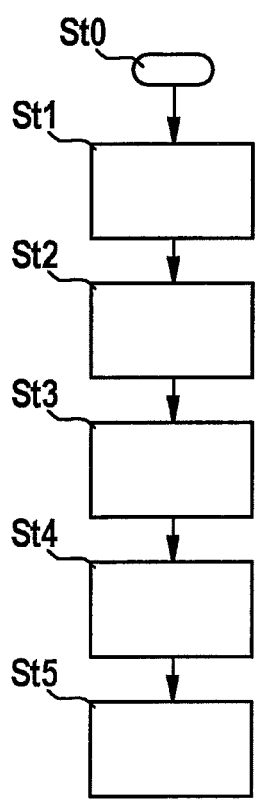
FIG. 8 shows a flow diagram of a production method according to the present invention.

For the mounting and/or production of camera module 1 shown in FIGS. 1, 2, according to FIG. 8, after a start in step St0, in step St1 first objective 3 formed by lens mount 5 and lens 4 is placed from the front side, i.e. from the left in FIGS. 1, 2, into first housing part 11, so that surfaces 16 and 37 come to be seated, i.e. when shoulder 38 of lens mount 5 meets first housing part 11. Here, a glue can be used between surfaces 16, 37, or e.g. a hot caulking or welding can take place.

Then in a second step St2 bearer device 9, with already-mounted and contacted image sensor 8, can be placed on lens mount 5 from the right, i.e. from the rear side, so that inner bearer ring 19 engages in groove 20 and outer bearer ring 18 comes to be seated on objective fitting surface 39. Here there takes place a longitudinal displacement of bearer device 9 along optical axis 28, with acquisition of a test pattern and evaluation of image signals S1, until adjustment has been achieved by reaching an optimal image.

In step St3, bearer device 9 is then fixed on lens mount 5, e.g. by gluing inner bearer ring 19 in groove 20 and/or by gluing or welding fitting surface 41 of outer bearer ring 18 on second objective fitting surface 39.

In step St4, bearer device 9 is contacted to circuit board 13 via data line 14, circuit board 13 for example already having been fixed on first housing part 11 by gluing. However, this contacting of step St4 can also already have taken place previously, so that circuit board 13 and its components are already used for the evaluation of image signals S1.

In step St5, camera housing 10 is sealed by fastening lower, second housing part 12 on first housing part 11, e.g. through caulking, gluing, welding, or any other type of commercial fastening that can be used.

Figure 4:
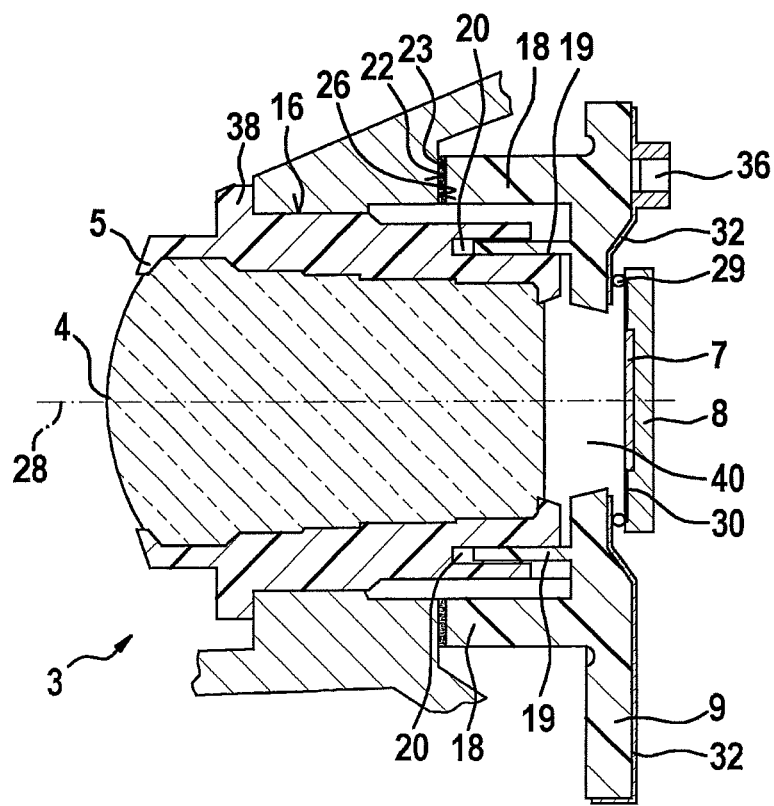
FIG. 4 shows the assembly of objective and bearer device of the specific embodiment of FIG. 3.

In the second specific embodiment shown in FIGS. 3, 4, objective 3 has only first objective fitting surface 16 as fitting segment, ensuring the seating of objective 3 in first housing part 11, but does not have second objective fitting surface 41 shown in FIGS. 1, 2.

In the second specific embodiment, the fixing of the bearer device in step St3 on first housing part 11 here takes place for example via a frontal annular contact surface (fitting surface) 22 of outer bearer ring 18, and a corresponding annular second housing fitting surface 26, e.g. by gluing, in particular using an adhesive layer 23 that is for example applied from outside and that fills a gap between surfaces 22, 26.

The second specific embodiment offers additional degrees of freedom as tolerance compensation for the positioning of bearer device 9, by which certain deviations of objective 3, in particular image plane tilting, or of bearer device 9, in particular a lateral offset of image sensor 8, can be compensated in an active adjustment up to a certain extent. Groove 20 for inner sealing ring 19 (particle shielding) can be configured larger than in FIG. 1 in order to support this tolerance compensation.

Figure 5:
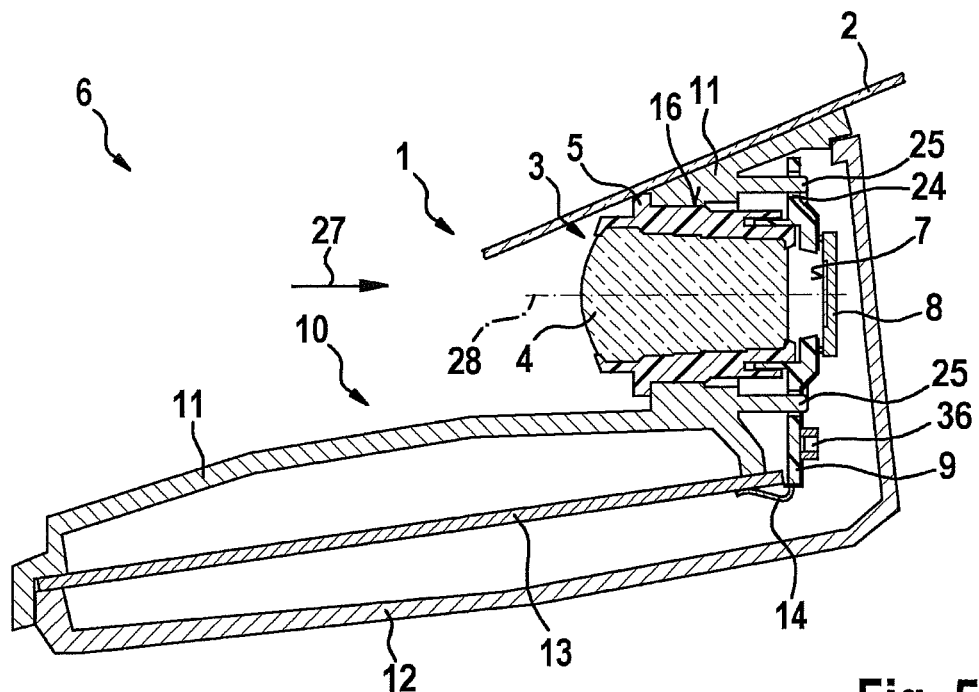
FIG. 5 shows a third specific embodiment of a camera module in longitudinal section.
Figure 6:
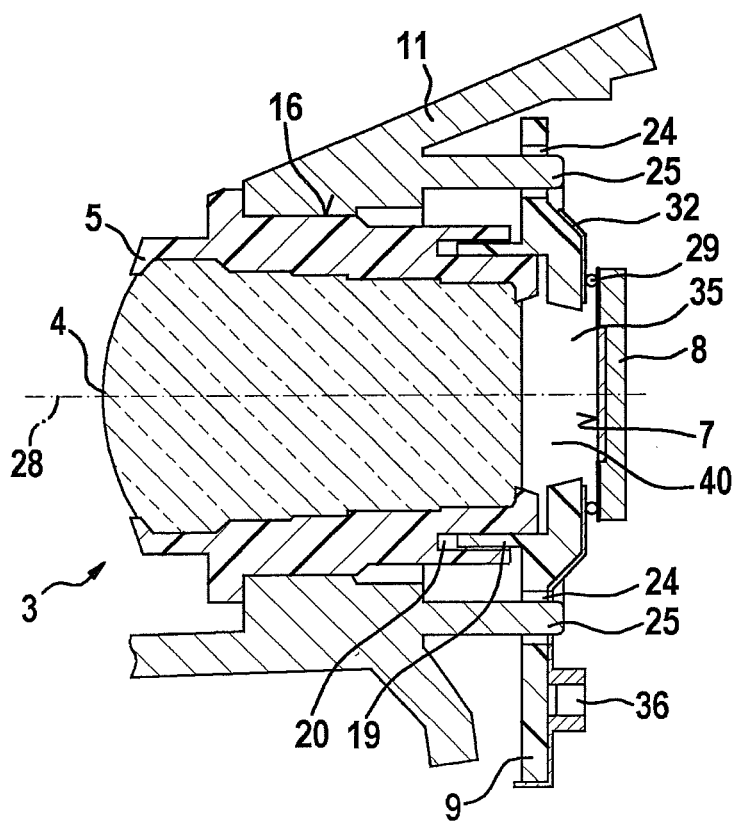
FIG. 6 shows the assembly of objective and bearer device of the specific embodiment of FIG. 5.

In the third specific embodiment of FIGS. 5 and 6, bearer device 9, which bears image sensor 8, is also fixed on first housing part 11; however, no outer bearer ring 19 is provided; rather, a point anchoring is provided. For this purpose, bearer device 9 has, as shown in FIG. 6, one or more receptacles 24 (openings, through-holes), in which there engages a corresponding number of anchoring elements 25 of first housing part 11, which may be extending parallel to optical axis 28. This bonding can again take place through gluing.

At least three receptacles may be provided in bearer device 9 and anchoring elements 25 of first housing part 11, e.g. in symmetrical configuration, in particular 120°. A high degree of mechanical stability is achieved by the plurality of point-type bonds.

What is claimed is:

1. A camera module for mounting on a vehicle windshield, comprising:
    an objective having a lens mount and at least one lens;
    an image sensor including a light-sensitive sensor surface for acquiring and converting optical signals into electrical image signals;
    a bearer device on which the image sensor is mounted externally and electrically contacted; and
    a camera housing for accommodating the objective and the bearer device, wherein the camera housing has a first housing part, which is an upper housing part, and a second housing part, which is a lower housing part, and wherein the bearer device and the image sensor are enclosed by the second housing part;
    wherein the objective is connected to the camera housing and is borne by the camera housing,
    wherein the bearer device has at least one objective receptacle arrangement that at least one of accommodates and seals the objective, and
    wherein the first housing part, which is the upper housing part, is closed at the rear and at the bottom by the lower housing part.

2. The camera module of claim 1, wherein the first housing part has a first housing fitting surface, and the objective has a first objective fitting surface, the first housing fitting surface and the first objective fitting surface being connected to one another directly or via an intermediate arrangement.

3. The camera module of claim 2, wherein the first housing fitting surface and the first objective fitting surface are cylindrical at least in some regions, and on the objective or on the first housing part there is a shoulder determining the position of the objective in the first housing part.

4. The camera module of claim 1, wherein the bearer device is a three-dimensionally contoured circuit bearer that has at least one printed conductor electrically contacting the image sensor.

5. The camera module of claim 4, wherein the at least one objective receptacle arrangement is on a front side, oriented toward the objective, of the bearer device, and the at least one printed conductor is a wiring level on the rear side of the bearer device.

6. The camera module of claim 4, wherein the bearer device has an opening in the region of the optical axis, and the image sensor is mounted on the rear side of the bearer device so that its light-sensitive sensor surface is oriented through the opening toward the objective.

7. The camera module of claim 6, wherein signal lines, contacting surfaces, and the light-sensitive sensor surface of the image sensor are on the front side of the image sensor, the contacting surfaces being contacted to the at least one printed conductor of the bearer device via a contacting arrangement.

8. The camera module of claim 4, wherein the bearer device is a one-part circuit bearer made of a plastic, and the at least one objective receptacle arrangement includes a profiling that stands out in the direction of the optical axis.

9. The camera module of claim 8, wherein the objective receptacle arrangement seals the objective via a sealing arrangement that engages in a groove or recess of the objective and is capable of being longitudinally displaced in the groove or recess in the direction of the optical axis for a focusing of the image sensor relative to the objective.

10. The camera module of claim 1, wherein the bearer device is fixed and held on the objective.

11. The camera module of claim 2, wherein the objective has a second objective fitting surface, offset relative to the first objective fitting surface along the optical axis, for fastening the bearer device.

12. The camera module of claim 1, wherein the bearer device is fixed and held on the camera housing.

13. The camera module of claim 12, wherein the at least one objective receptacle arrangement of the bearer device includes a bearer ring that runs essentially parallel to the optical axis, the ring being fixed on the end face on the first housing part.

14. The camera module of claim 1, wherein the bearer device is contacted to a main circuit bearer accommodated on the first housing part.

15. The camera module of claim 1, wherein the camera module is for a vehicle.

16. The camera module of claim 6, wherein the light-sensitive sensor surface is oriented through the opening toward the objective in flip-chip technology.

17. The camera module of claim 7, wherein the contacting arrangement includes a stud bump.

18. The camera module of claim 8, wherein the bearer device is an injection-molded circuit bearer, and the at least one objective receptacle arrangement is configured as a ring.

19. The camera module of claim 1, wherein the objective receptacle arrangement seals the objective via a sealing ring that runs concentrically about the optical axis, that engages in a groove or recess of the objective and is capable of being longitudinally displaced in the groove or recess in the direction of the optical axis for a focusing of the image sensor relative to the objective.

20. The camera module of claim 1, wherein the bearer device is fixed and held on the objective on the lens mount.

21. The camera module of claim 1, wherein the bearer device is fixed and held on the camera housing on the first housing part.

22. The camera module of claim 1, wherein the bearer device is contacted to a main circuit bearer accommodated on the first housing part via a flexible data line.

23. A camera module for mounting on a vehicle windshield, comprising:
an objective having a lens mount and at least one lens;
an image sensor including a light-sensitive sensor surface for acquiring and converting optical signals into electrical image signals;
a bearer device on which the image sensor is mounted externally and electrically contacted; and
a camera housing for accommodating the objective and the bearer device, wherein the camera housing has a first housing part, which is an upper housing part, and a second housing part, which is a lower housing part, and wherein the bearer device and the image sensor are enclosed by the second housing part;
wherein the objective is connected to the camera housing and is borne by the camera housing,
wherein the bearer device has at least one objective receptacle arrangement that at least one of accommodates and seals the objective, and
wherein a surface of the first housing part is configured for mounting to the vehicle windshield, and wherein the first housing part, which is the upper housing part, is closed at the rear and at the bottom by the lower housing part,
wherein the bearer device is fixed and held on the camera housing, and
wherein the bearer device has receptacles, in which anchoring elements of the first housing part are fastened.

24. The camera module of claim 23, wherein the receptacles are openings.

25. A method for producing a camera module for mounting on a vehicle windshield, the method comprising:
fastening an objective on a first housing part;
placing a bearer device, on which an image sensor is mounted externally and electrically contacted, on the objective;
adjusting the bearer device through longitudinal displacement of the bearer device along an optical axis of the objective, with evaluation of image signals of the image sensor;
fixing the bearer device on at least one of the objective and the first housing part; and
sealing the first housing part by at least one second housing part, so as to form a camera housing in which the objective and the bearer device are accommodated;
wherein the camera module includes:
the objective, which includes a lens mount and at least one lens;
the image sensor, which acquires and converts optical signals into electrical image signals;
the bearer device on which the image sensor is mounted externally and contacted; and
the camera housing, wherein the camera housing has a first housing part, which is an upper housing part, and a second housing part, which is a lower housing part, and
wherein the bearer device and the image sensor are enclosed by the second housing part;
wherein the objective is connected to the camera housing and is borne by the camera housing, and wherein the bearer device has at least one objective receptacle arrangement that at least one of accommodates and seals the objective, and wherein a surface of the first housing part is configured for mounting to the vehicle windshield, and wherein the first housing part, which is the upper housing part, is closed at the rear and at the bottom by the lower housing part.

\* \* \* \* \*